(12) United States Patent
Seki

(10) Patent No.: US 6,831,374 B2
(45) Date of Patent: Dec. 14, 2004

(54) FLUID POWER GENERATOR (75) Inventor: Kazuichi Seki, Kanagawa (JP)

(73) Assignee: Tokai University Educational Systems, Tokyo (JP)

(*) Notice: Subject to any disclaimer, the term of this patent is extended or adjusted under 35 U.S.C. 154(b) by 0 days.

(21) Appl. No.: 10/451,290

(22) PCT Filed: Nov. 8, 2002

(86) PCT No.: PCT/JP02/11652
§ 371 (c)(1),
(2), (4) Date: Jun. 19, 2003

(87) PCT Pub. No.: WO03/040557
PCT Pub. Date: May 15, 2003

(65) Prior Publication Data
US 2004/0041406 A1 Mar. 4, 2004

(30) Foreign Application Priority Data
Nov. 8, 2001 (JP) ......................... 2001-342926

(51) Int. Cl.[7] ................................. F03D 7/00
(52) U.S. Cl. ...................... 290/44; 290/42; 290/45; 290/54; 290/55; 290/52
(58) Field of Search ................ 290/44, 45, 42, 290/55, 52, 54

(56) References Cited

U.S. PATENT DOCUMENTS 4,585,950 A * 4/1986 Lund .......................... 290/44
4,906,060 A * 3/1990 Claude ........................ 332/29
6,304,002 B1 * 10/2001 Dehlsen ........................ 290/1

FOREIGN PATENT DOCUMENTS

| JP | 5-164037 | 6/1993 | ............ H02P/9/00 |
| JP | 8-322297 | 12/1996 | .......... H02K/21/22 |
| JP | 2001-186740 | * 7/2001 | .......... H02K/21/22 |

* cited by examiner

Primary Examiner—Nicholas Ponomarenko
Assistant Examiner—Iraj A. Mohandesi
(74) Attorney, Agent, or Firm—Butzel Long (57) ABSTRACT A fluid power generator system includes an operating mode in which a continuously variable output corresponding to a wide range of a flow rate is given by selectively combining generators with optimum rated outputs from said plurality of generators according to natural fluid energy and the number of rotations of a wing axial shaft; and control means for controlling the operation of each of the generators on the basis of a tip speed calculated from the flow rate of the operative fluid and the number of rotations of said wing axial shaft, thereby acquiring a maximum output for specific flow rate of the operative fluid. In this configuration, the fluid power generator system using operative fluid energy as a driving source can generate a continuously variable output corresponding to a wide range of the flow rate of the fluid and provides a maximum output for an individual flow rate of the operative fluid, thereby increasing a quantity of generated power (by 40% or more than before).

7 Claims, 6 Drawing Sheets

FLUID POWER GENERATOR

TECHNICAL FIELD

This invention relates to a fluid power generator system for converting natural energy such as wind into rotary energy to be used as electric energy, and more particularly to a fluid power generator capable of improving power generating efficiency.

BACKGROUND ART

As a fluid power generating device which uses operating fluid energy as a driving source to generate electric power, a wind vane generator using wind power has been proposed. In the field of this wind vane generator, with development of aerodynamics in recent years, a wing with air resistance and lifting power has been developed. By adopting it in a wind vane, energy conversion with high efficiency of wind power energy with low density and great variability, which was difficult conventionally, has been enabled.

At present, the main tendency is a wind power generator in several hundreds of KW. In the future, the wind power generator with great rated output will be produced. On the other hand, the generator which converts the rotary energy into electric energy is directly coupled with a wing, power within a range of the rated output is generated.

In a generator used in a conventional fluid power generator, to produce a continuously variable output according to a flow rate in a wide range by one unit generator exceeds a standard manufacturing limit of the generator. This leads to an increase in production cost. Therefore, the standard generator used presently, which rotates fixedly with a fixed output, provides a small range between a cut-in flow rate and a cut-out flow rate and cannot efficiently use the energy of the operating fluid.

An object of this invention is to provide a fluid power generator which can generate electric power with a continuously variable output corresponding to a change in the wide range of operating fluid energy such as wind and produce a maximum output in a specific flow rate of the operating fluid.

DISCLOSURE OF THE INVENTION

In order to attain the above object, there is provided a fluid power generator system including a plurality of generators with different rated outputs which are coupled with a wing axial shaft which is rotated by operative fluid energy serving as a driving source, comprising:

an operating mode in which a continuously variable output corresponding to a wide range of a flow rate is given by selectively combining generators with optimum rated outputs from the plurality of generators according to the flow rate of the operative fluid; and control means for controlling the operation of each of the generators on the basis of a tip speed calculated from the flow rate of the operative fluid and the number of rotations (rotational speed) of the wing axial shaft, thereby acquiring a maximum output for an individual flow rate of the operative fluid.

Further, there is provided a fluid power generator system including a plurality of fluid power generating units with different rated outputs which are coupled with a wing axial shaft which is rotated by operative fluid energy serving as a driving source, the fluid power generating units being stacked in a plurality of stages, comprising:

an operating mode in which a continuously variable output corresponding to a wide range of a flow rate is given by selectively combining generators with optimum rated outputs from the plurality of generators according to the flow rate of the operative fluid; and control means for controlling the operation of each of the generators on the basis of a tip speed calculated from the flow rate of the operative fluid and the number of rotations of the wing axial shaft, thereby acquiring a maximum output for an individual flow rate of the operative fluid.

Further, there is provided a fluid power generator system including a plurality of wing axial shafts which stand upright coaxially and rotatably to rotate by operative fluid energy serving as a driving source, a plurality of rotary wings having linear blades attached to the wing axial shafts in a plurality of stages, respectively; and a plurality of generators with different rated outputs which are coupled with the axial shafts, respectively, comprising:

an operating mode in which a continuously variable output corresponding to a wide range of a flow rate is given by selectively combining generators with optimum rated outputs from the plurality of generators according to the flow rate of the operative fluid; and control means for controlling the operation of each of the generators on the basis of a tip speed calculated from the flow rate of the operative fluid and the number of rotations of the wing axial shaft, thereby acquiring a maximum output for an individual flow rate of the operative fluid.

In the fluid power generator system, the control means controls the operation of each of the generators in the operating mode on the basis of a tip speed ratio calculated from the flow rate of the operative fluid and higher number of rotations exceeding an output peak value at the number of rotations of the wing axial shaft.

In the fluid power generator system, the fluid power generating units with different rated outputs stacked in a plurality of stages are arranged to provide rated outputs changed according to a height of a position of each stage.

BEST MODE FOR CARRYING OUT THE INVENTION

Now referring to the drawings, an explanation will be given of various embodiments of this invention.

Figure 1:
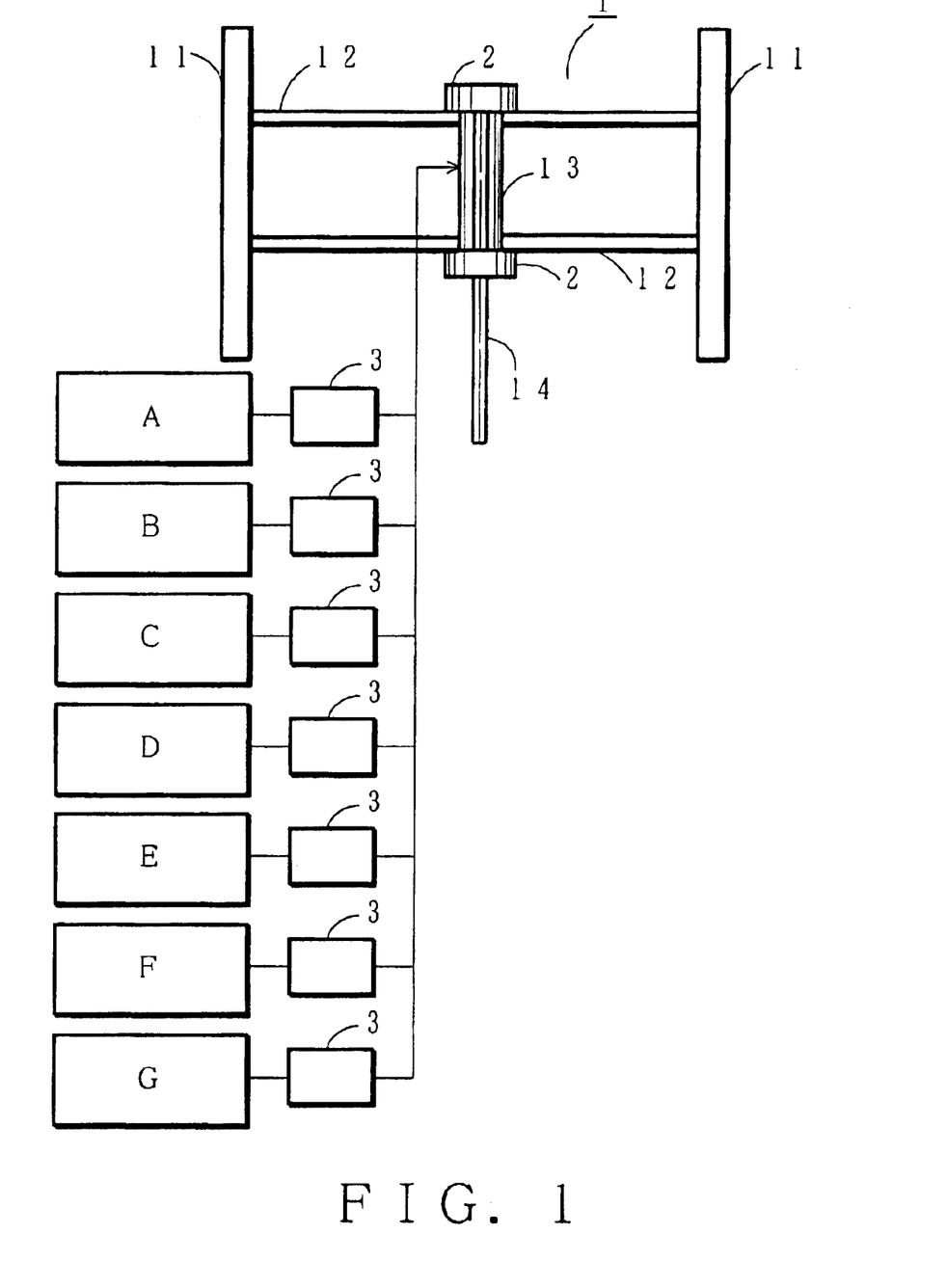
FIG. 1 is a conceptual view showing a first embodiment of this invention.

The first embodiment as shown in FIG. 1 is a wind power generating system which converts wind energy serving as operating fluid energy into rotary energy to be used as electric energy serving operating fluid energy.

In the embodiment shown in FIG. 1, a wind vane 1 is provided with e.g. three linear blades 11 which are integrally connected to a wing axial shaft 13 through two (upper and lower) supporting blades 12. The wing axial shaft 13 is formed in an outer rotor structure in which it is inserted rotatably into a fixed shaft 14 fixed to a tower structure. The outer rotor structure of the wing axial shaft 13 reduces the weight and facilitates the start of the wind vane to improve the performance. The wing axial shaft 13 is provided with two bearings at the upper and lower ends. The bearings may be those using magnetic levitation as shown in FIG. 2.

Figure 2:
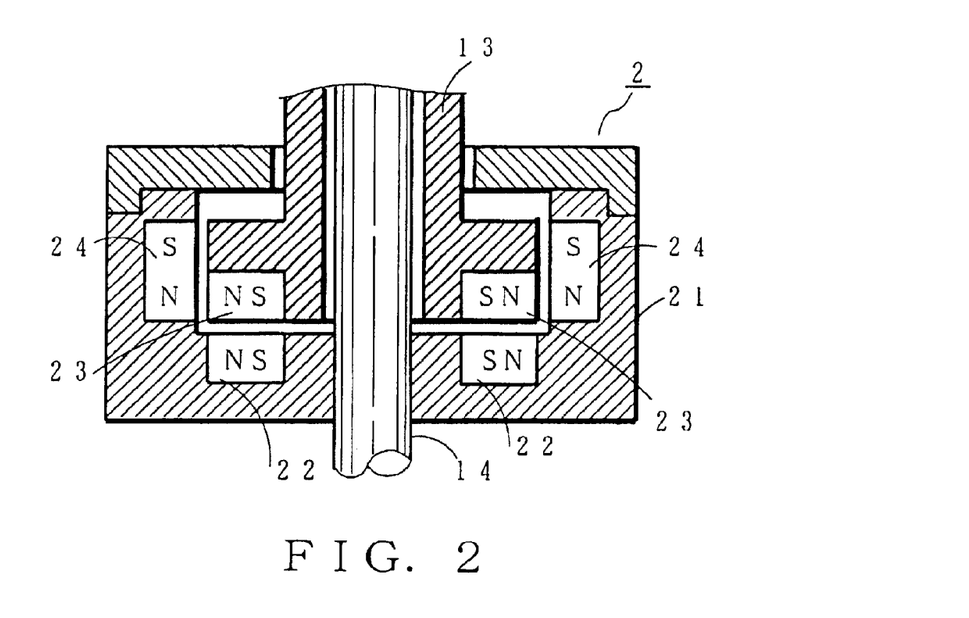
FIG. 2 is a sectional view showing the main part of an example of a bearing in FIG. 1.

The structure of the magnetic levitated bearing shown in FIG. 2 can be made in non-contact with the wing axial shaft 13 in both vertical direction (shaft direction) and horizontal direction because of repulsion force of the magnetic force.

First, as shown in FIG. 2, a permanent magnet 22 of a bearing frame 21 and a permanent magnet 23 of the wing axial shaft 13 assume different polarities from each other. Therefore, in a vertical direction, the wing axial shaft 13 is vertically supported in non-contact with the bearing frame 21. In a horizontal direction also, the permanent magnet 24 in the bearing frame 21 and permanent magnet 23 in the wing axial shaft 13 repel each other so that the wing axial shaft 13 is horizontally supported in non-contact with the bearing frame 21.

The generator system in the embodiment shown in FIG. 1 is provided with seven generators A to G such as synchronous generators (three-phase current) with stepwise different rated outputs. The seven generators A to G are mechanically coupled with the wing axial shaft 13 by a transmission means 3 such as a clutch or timing belt. The coupling or decoupling of the seven generators A to G to the wing axial shaft 13 is carried out by automatically changing the transmission means according to the level of the wind speed which is detected by a wind meter (not shown) or the number of rotations signal corresponding to the number of rotations of the wing axial shaft 13.

Figure 3:
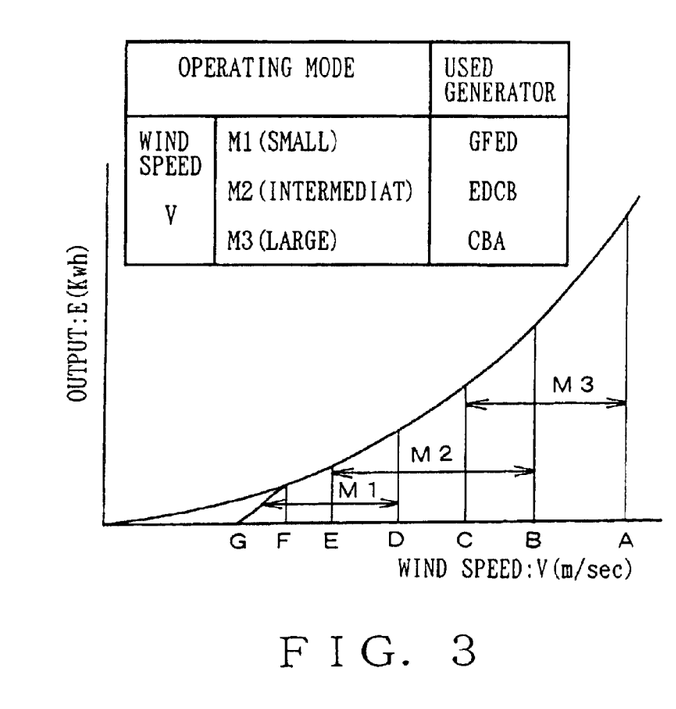
FIG. 3 is a characteristic graph showing the operating modes of a plurality of generators.
Figure 4:
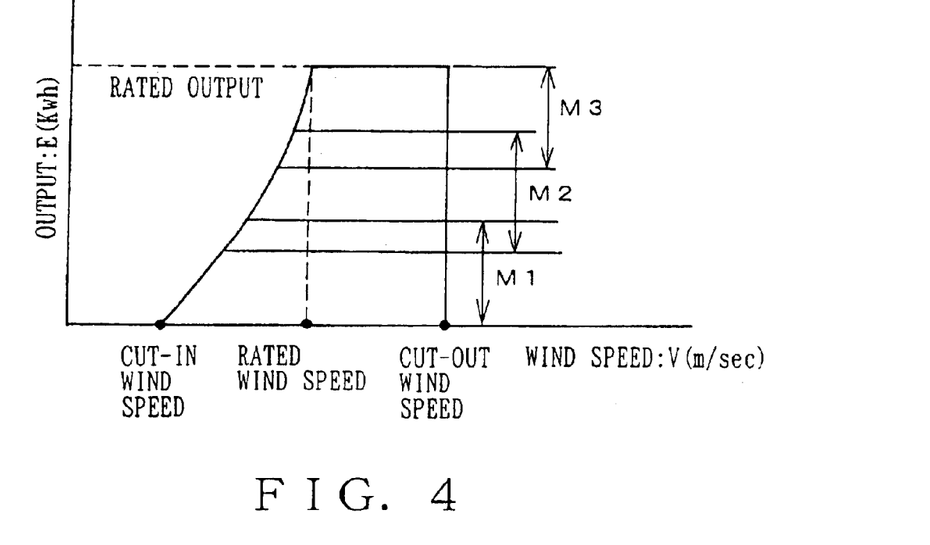
FIG. 4 is a characteristic graph showing the operating modes of a plurality of generators.

The selection and combination of the generators A to G according to the wind speed constitute operating modes M1 to M3 corresponding to the wide range of the wind speed from a cut-in wind speed to a cut-out wind speed as shown in FIGS. 3 and 4. In the operation mode M1 corresponding to a small wind speed, the generators G to D are used. In the operation mode M2 corresponding to an intermediate wind speed, the generators E to B are used. Further, in the operation mode M3 corresponding to the wind speed which further increases to reach the rated wind speed, the generators C to A are used.

By designing the operating modes M1 to M3 in this way, unlike the operation by a single generator, the shortage of capacity of the generator system does not occur. In addition, by combining the generators with relatively small rated outputs and with low production cost, the operation according to each wind speed can be made and the wind energy can be efficiently used.

Figure 6:
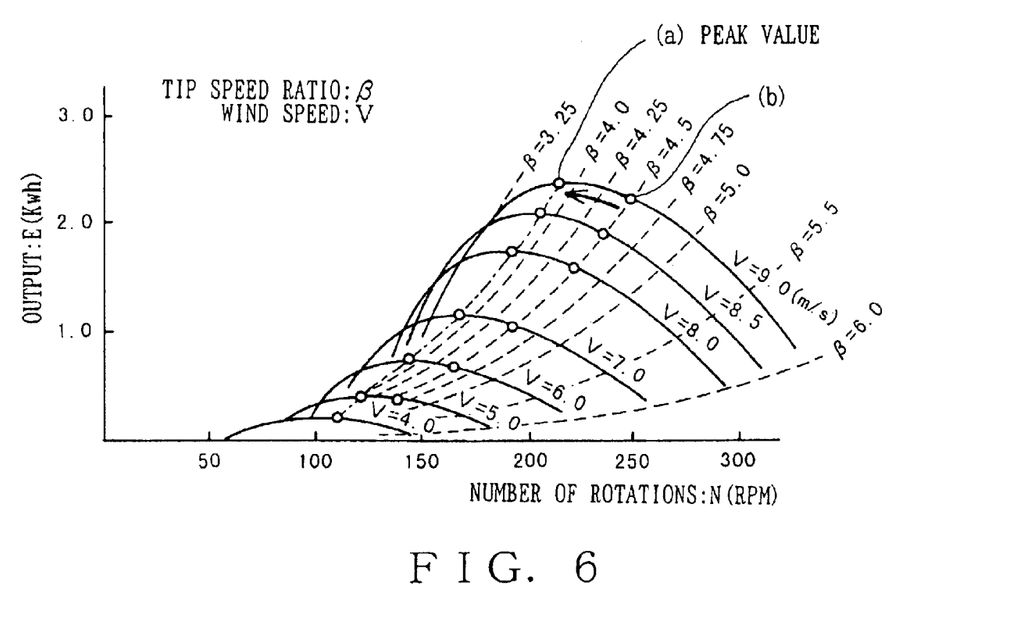
FIG. 6 is a characteristic graph showing an example of controlling the tip speed ratio.

In the embodiment shown in FIG. 1, the operation of each of the generators A to G can be controlled on the basis of the tip speed ratio $\beta$ ($\beta$=number of rotations N or rotor tip speed/wind speed V) which has been calculated from the wind speed V and the number of rotations N of the wind axial shaft 13. The rotor tip speed is represented by $2\pi RN$ (R is a diameter). Assuming that $2\pi R$ is constant, the rotor tip speed can be replaced by the number of rotations N. Specifically, as shown in FIG. 6, when the generator (e.g. A) is coupled with the wind axial shaft 13 at a higher number of rotations, i.e. point (b) ($\beta$=4.5) exceeding a peak value, i.e. point (a) of the wind speed V=9 m/sec., the generator serves as a load for the wind axial shaft 13. As a result, the number of rotations N of the wing axial shaft 13 decreases like an counterclockwise arrow in FIG. 6 and reaches the peak value, i.e. point (a) of the output.

Figure 5:
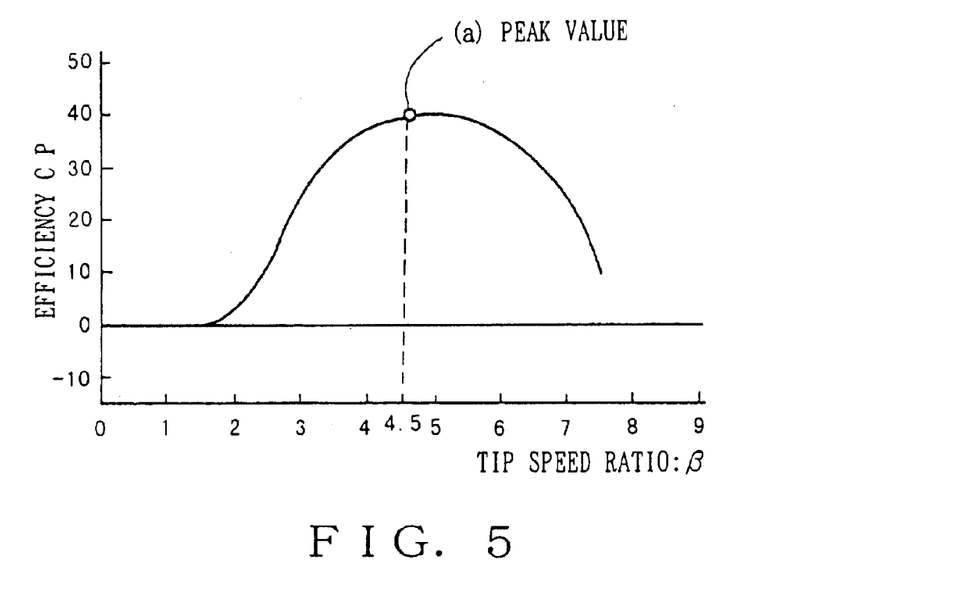
FIG. 5 is a characteristic graph of power generating efficiency versus a tip speed ratio.

Because the maximum efficiency of the wind vane 1 is actually obtained at the tip speed ratio $\beta \approx 4.5$, the operation should be made in the vicinity of $\beta$=4.5. In this way, by controlling each of the generators A to G on the tip speed ratio, as seen from FIGS. 5 and 6, these generators A to G can be operated at the peak value, i.e. point (a) so that the maximum output according to a specific wind speed can be obtained.

Figure 7:
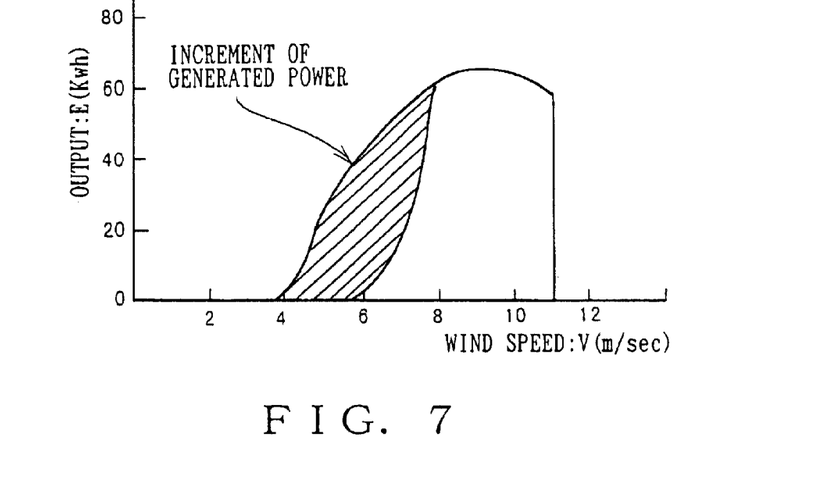
FIG. 7 is a characteristic graph showing an increment of the quantity of power generated by executing the operating mode.

FIG. 7 is a graph showing an increment of the quantity of power generated according to the embodiment of FIG. 1. As seen from FIG. 7, since the generators with optimum rated outputs are combined selectively from the plurality of generators A to G according to the wind speed V to provide the operating mode M1 to M3 having a continuously variable output according to a wide range of the wind speed, and since the operation of each of the generators A to G is controlled on the basis of the tip speed ratio $\beta$ which has been calculated from the wind speed V and the number of rotations N of the wind axial shaft to obtain the maximum output at the specific wind speed V, the quantity of generated power increased by 40–60% from that in a conventional generator can be obtained.

Figure 8:
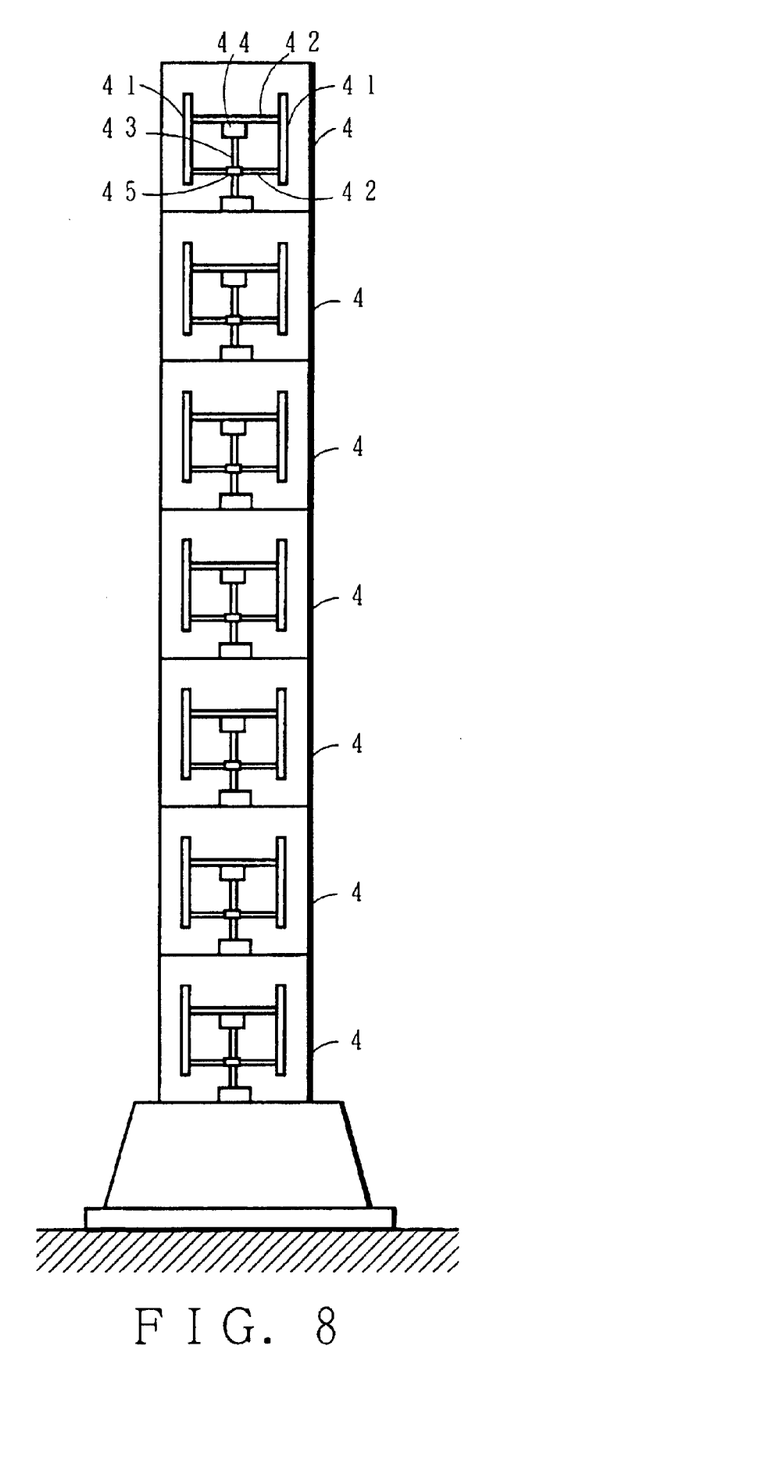
FIG. 8 is a conceptual view of the second embodiment of this invention.

FIG. 8 shows a second embodiment of a wind power generator system in which wind vane generator units are stacked in plural stages. The wind vane unit 4 has e.g. three linear blades 41. Each linear blade 41 is attached to a wing axial shaft 43 of an outer rotor type by upper and lower two supporting blades 42. Numeral 44 denotes a generator serving as a upper bearing and numeral 45 denotes a lower bearing.

In the second embodiment shown in FIG. 8, like the wind power generator system shown in FIG. 1, according to a wind speed, the wind vane generating units having optimum rated outputs are selectively combined from the plurality of wind vane generating units with different rated outputs to provide the operating modes M1 to M3 as shown in FIGS. 3 and 4. In addition, in this second embodiment, on the basis of the tip speed ration $\beta$ calculated from the wind speed V and the number of rotations N of the wind axial shaft 43, the operation of the wind vane generating units is controlled to provide the maximum output for the specific wind speed. The second embodiment shown in FIG. 8 could provide the same effect as the first embodiment shown in FIG. 1.

As an application of the wind power generator designed in plural stages system shown in FIG. 8, according to the height of the stacked wind vane generating units 4, the rated outputs of the generators 44 may be changed. For example, in a higher stage in which wind may receive wind more strongly, the generator having a larger quantity of power may be arranged. This permits the wind power generator system to be operated more effectively. Further, in the higher stage, the size of the wind vane and the number of the blades thereof may be changed to change its power to be generated.

Figure 9:
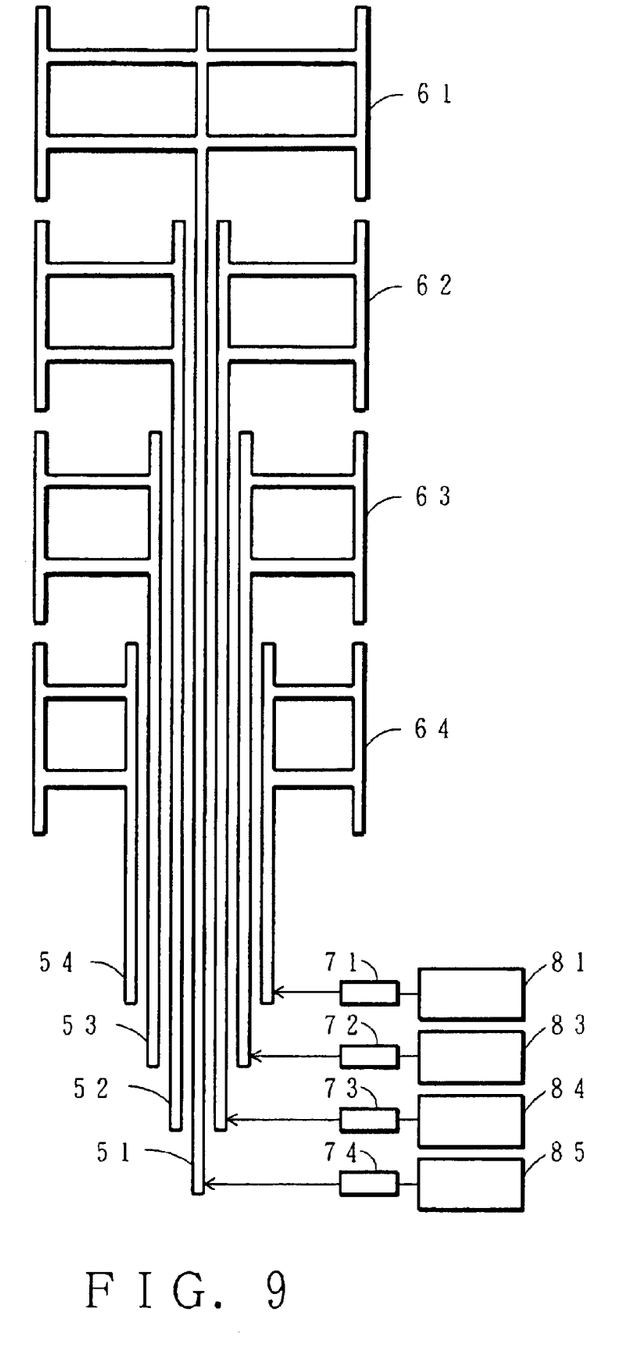
FIG. 9 is a conceptual view of the third embodiment of this invention.

FIG. 9 shows a wind power generator system according to a third embodiment of this invention. In this embodiment, wind vanes with coaxial wing axial shafts are arranged in a plurality of stages. Specifically, the wind power generator system according to this embodiment includes four wing axial shafts 51 to 54 which stand upright coaxially and rotatably; wind vanes 61 to 64 attached to the wing axial shafts 51 to 54 in four stages; and power generators 81 to 84 which are coupled with the axial shafts 51 to 54, respectively through transmission means 71 to 74. By combining two of the four coaxial wing axial shafts 81 to 84, a "two-shaft inverted type" power generator system can be constructed.

In the third embodiment shown in FIG. 8, according to a wind speed, the wind vane generating units having optimum rated outputs are selectively combined from the four generators 81 to 84 to provide an operating mode having a continuously variable output corresponding to a wide range of the wind speed. In addition, in this third embodiment, on the basis of the tip speed ratio calculated from the wind speed and the number of rotations of the wind axial shaft, the operation of the generators 81 to 84 is controlled to provide the maximum output for each wind speed. The third embodiment shown in FIG. 9 could provide the same effect as the first embodiment shown in FIG. 1.

In the respective embodiments described above, the wind vane generator systems have been explained. However, the fluid power generator system according to this invention should not be limited to the wind vane generator, but may be applied to a hydroelectric or other generator system. Further, this invention is combined with photovoltaic power generation to provide a hybrid power generating system. In place of the supporting blade 12, a disk which serves as can be employed. On the side wall of a high building, The axial shaft 13 may be located not vertically but horizontally.

Industrial Applicability

As understood from the description hitherto made, in accordance with the invention described in claim 1, the fluid power generator system can be operated in an operating mode in which the generators are selectively combined in the most preferable way according to a flow rate of the operative fluid, thereby acquiring the greatest efficiency of the flow rate. The fluid power generator system can be operated in combination of generators which are inexpensive and provide relatively small rated outputs. Therefore, the fluid power generator system which has a rated output exceeding a standard manufacturing limit of a single generator. Further, the cut-in flow rate can be decreased so that power can be generated at a lower flow rate. The cut-out flow rate can also be increased so that the fluid power generator system can generate power in a wide range of the flow rate of the fluid. On the basis of a tip speed ratio calculated from the flow rate of the operative fluid and the number of rotations of said wing axial shaft, the operation of each of the generators so that the maximum output can be obtained at the individual flow rate of the operative fluid, thereby improving the efficiency of power generation. As a result, the operating efficiency of the fluid power generator system can be improved and the quantity of generated power can be increased.

In accordance with the invention described in claim 2, in addition to the advantage of claim 1, the power generating units can be stacked in a plurality of stages. Therefore, the power generating units can be easily communized in a small installing space, thereby suppressing the entire installation cost.

In accordance with the invention described in claim 3, in addition to the advantage of claim 1, the coaxial wing axial shafts are used so that the fluid power generator system can be miniaturized and its start-up can facilitated.

In accordance with the invention described in claim 4, the operation of the generator can be automatically controlled at a peak value of the power generation efficiency, thereby acquiring the maximum output for the individual flow rate of the operative fluid. As a result, the operating efficiency of the fluid power generator system can be improved and the quantity of generated power can be increased.

In accordance with the invention described in claim 5, where the flow rate is varied at different positions through which the fluid flows, the generator with the rated output which is most suitable to the flow rate can be selected. Therefore, it is not necessary to used the generator having an excessively great rated output.

What is claimed is:

1. A fluid power generator system including a plurality of generators with different rated outputs which are coupled with a wing axial shaft which is rotated by operative fluid energy serving as a driving source, comprising:

an operating mode in which a continuously variable output corresponding to a wide range of a flow rate is given by selectively combining generators with optimum rated outputs from said plurality of generators according to the flow rate of the operative fluid; and control means for controlling the operation of each of the generators on the basis of a tip speed calculated from the flow rate of the operative fluid and the number of rotations of said wing axial shaft.

2. A fluid power generator system including a plurality of fluid power generating units with different rated outputs which are coupled with a wing axial shaft which is rotated by operative fluid energy serving as a driving sources said fluid power generating units being stacked in a plurality of stages, comprising:

an operating mode in which a continuously variable output corresponding to a wide range of a flow rate is given by selectively combining generators with optimum rated outputs from said plurality of generators according to the flow rate of the operative fluid; and control means for controlling the operation of each of the generators on the basis of a tip speed calculated from the flow rate of the operative fluid and the number of rotations of said wing axial shaft.

3. A fluid power generator system including a plurality of wing axial shafts which stand upright coaxially and rotatably to rotate by operative fluid energy serving as a driving source, a plurality of rotary wings having linear blades attached to the wing axial shafts in a plurality of stages, respectively; and a plurality of generators with different rated outputs which are coupled with the axial shafts, respectively, comprising:

an operating mode in which a continuously variable output corresponding to a wide range of a flow rate is given by selectively combining generators with optimum rated outputs from said plurality of generators according to the flow rate of the operative fluid; and control means for controlling the operation of each of the generators on the basis of a tip speed calculated from the flow rate of the operative fluid and the number of rotations of said wing axial shaft.

4. A fluid power generator system according to claim 1, wherein said control means controls the operation of each of the generators in said operating mode on the basis of a tip speed calculated from the flow rate of the operative fluid and higher number of rotations exceeding an output peak value at the number of rotations of said wing axial shaft.

5. A fluid power generator system according to claim 2, wherein said fluid power generating units with different rated outputs stacked in a plurality of stages are arranged with rated outputs changed according to a height of a position of each stage.

6. A fluid power generator system according to claim 2, wherein said control means controls the operation of each of the generators in said operating mode on the basis of a tip speed calculated from the flow rate of the operative fluid and higher number of rotations exceeding an output peak value at the number of rotations of said wing axial shaft.

7. A fluid power generator system according to claim 3, wherein said control means controls the operation of each of the generators in said operating mode on the basis of a tip speed calculated from the flow rate of the operative fluid and higher number of rotations exceeding an output peak value at the number of rotations of said wing axial shaft.

* * * * *